Patented June 9, 1942

2,285,773

UNITED STATES PATENT OFFICE 2,285,773

CHEMICAL SUBSTANCE

Benjamin R. Harris, Chicago, Ill., assignor to Colgate-Palmolive-Peet Company, Jersey City, N. J., a corporation of Delaware No Drawing. Application August 7, 1940, Serial No. 351,767

12 Claims. (Cl. 260—400)

My invention relates to a new class of chemical substances, and more in particular to a new class of chemical substances particularly adapted for use as detergent, penetrating, emulsifying, lathering, flotation, anti-spattering or frothing purposes or reducing the surface tension of water.

In certain classes of industries, there is a need for a certain class of chemical substances usually used in relatively small quantities but capable of use in larger quantities to secure an effect principally the result of a wetting action such as at a water-oil interface. In the textile and leather treating industries, for example, there are many situations where a wetting or detergent action is imperative, and many different chemical substances have been produced calculated to reduce surface tension and promote wetting in these industries. The use of prior art substances has not been attended with unqualified success in all instances. In certain other types of industries, such as the margarine industry, for example, problems in preventing the spattering of margarine in frying have arisen.

The principal object of my present invention is the provision of a new class of chemical substances capable of satisfactory use in connection with the problems hereinabove discussed.

Another object is the provision of a new class of chemical substances which are, in general, of relatively simple structure and can be cheaply made in commercial quantities.

Another object is the provision of a class of chemical substances of the character set forth, which in many instances will be innocuous and non-toxic, even though employed in such foods as margarine.

Another object is the provision of a new class of chemical substances having improved wetting characteristics.

Another object is the provision of a new class of substances with great utility in the treating of textile materials.

Other objects and features of the invention will be apparent from a consideration of the following detailed description:

Broadly speaking, the class of substances with which I am concerned are designated as hydrophillic lipins. One of the outstanding characteristics of the substance is the presence of lipophile and hydrophile groups in the molecule. A portion of the molecule has groups which are easily wetted by oils. This lipophile group in the substances which I have investigated is a radical of predominantly hydrocarbon characteristics, though it may also be an alcohol, ether, or ester group, or some other group, as will appear from the illustrations given below. The lipophile group has marked affinity for oils and fats, is readily capable of being wet by oleaginous media, and in general, at the water-oil interface, tends to cause the molecule, of which it is a part, so to orientate itself, apparently, that the lipophile group may stand in relatively closer proximity to the oil medium or phase, as contrasted with the aqueous medium. The hydrophillic portion of the molecule is a group which is easily wetted by water, and among these groups are such groups as OH groups or OH groups and sulphate groups. I have pointed out that if the hydrophillic lipin contains a hydrophile group which will sufficiently balance the lipophile group, then such substance, when used in small proportions, will act as an anti-spatterer preventing the spattering during frying of margarine made from milk and oleaginous material.

The lipophillic group is preferably of moderately high molecular weight, as will be seen from illustrations given below; however, the preferred magnitude of the molecular weight of the lipophillic group varies with the character of the hydrophillic group or groups coacting with it. Generally speaking, sufficient lipophillic mass and quality must be present in the molecule to properly offset and balance the hydrophillic group. An excess of lipophillic characteristics is undesirable since, in such a case, the substance as a whole becomes predominantly lipophile, becomes rather freely fat-soluble, no longer orientates itself as readily at the interface of water and oil in the margarine emulsion, and hence (assuming the employment of the substance in a margarine emulsion) largerly loses its anti-spattering power. The above is merely a hypothesis which appears to fit the discovered facts and helps to explain them.

Chemically, the substances of my present invention are, in general, ester derivatives of moderately high or high molecular weight fatty acids; or ether or ester derivatives of moderately high or high molecular weight alcohols, with at least one semi-esterified sulphuric acid group. In certain circumstances, there may be more than one semi-esterified sulphuric acid group, or there may be sulphuric acid groups that are totally esterified and other sulphuric acid groups that are semi-esterified, but in all cases there must be at least one semi-esterified sulphuric acid group.

The sulphuric acid group may be an acid sulphate group, but for my purposes is preferably neutralized with a suitable cation such as sodium, potassium or other metals, or ammonia, or a suitable amine such as triethanolamine, or the like, all as more fully explained hereinafter.

Considering the compounds from another aspect, the molecule in each instance contains a relatively high molecular weight lipophile group or groups and a hydrophile group or groups which, in the class of compounds to which my present invention relates, are principally sulphuric acid radicals which may or may not be neutralized. From still another angle, the compounds may be considered as combinations of a higher molecular weight lipophile group and the sulphate group linked together by means of a third group which is generally a residue of a polyhydroxy organic carboxylic acid having at least two esterifiable hydroxy groups and at least one carboxylic acid radical. A more complete understanding of what may comprise the lipophile groups and the intermediate radical which links the hydrophile group to the lipophile group will be had as the detailed description progresses.

I, therefore, have a substance containing a sulphate group and a lipophillic group of a sufficient molecular weight to balance the sulphate group. This substance may be a good anti-spattering substance when use in connection with margarine if the "balance" is sufficient; or it may function well in other industries as a wetting, penetrating, emulsifying, frothing, or detergent agent.

The function of the sulphuric acid groups is to impart hydrophillic properties, that is, water-wetting or water-attracting properties, to the molecule as a whole. When some types of neutralizing agents are used, this action is enhanced. The class of compounds with which this invention is particularly concerned are capable of further modification of the polar nature of the molecule by reaction of the carboxyl group or groups with ammonium or metallic compounds, such as alkali metal hydroxides, carbonates or the like, similar compounds of alkaline earth metals and metals having special properties such as the germicidal cations of mercury; with organic bases such as hydroxylamines and heterocyclic ring compounds similar to pyridine to form the corresponding salts of such organic bases; with alcohols to form ester groups; or with other compounds capable of reacting with a carboxyl group. The groups with which the sulphuric acid group is linked are, in general, of a lipophile character. At times they may be strongly lipophillic and at other times moderately lipophillic. They may be of comparatively low molecular weight (for example, with 4 carbon atoms), or of moderately high molecular weight (with, say, from 8 to 16 carbon atoms), or of distinctly high molecular weight (having 36 carbon atoms, for example), depending upon the purpose for which the substance may be used. Furthermore, the group or groups with which the sulphuric acid is esterified may have hydrophillic radicals of their own. An example of this type of substance is the sulphate of cetyl glycerate (sodium salt):

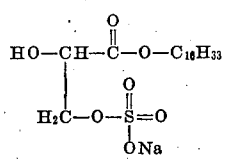

It is evident that in the above substance, the molecule which is esterified with sulphuric acid is cetyl glycerate, which happens to have one hydrophillic radical of its own, namely, the free hydroxyl group in the glyceric acid residue.

It should also be observed that the lipophile function in the above molecule is dependent principally upon the cetyl group. The hydrophile function is dependent principally upon the sulphate group. Furthermore, these two groups are linked together by means of a polyhydroxy, carboxy substance, namely, glyceric acid.

Some additional examples of members of the group of substances which I have discovered are as follows:

Octoyl ester of ethyl glycerate sulphate (ammonium salt)

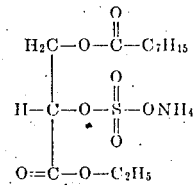

Methyl ester of hexyl mannonic acid sulphate (monoethyl amine salt)

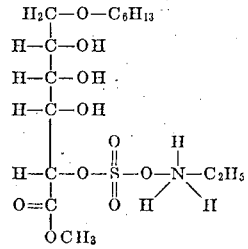

Sulphated palmitic acid ester of potassium dihydroxy stearate (potassium salt)

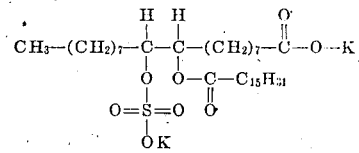

Sulphated myristic acid ester of di-methyl saccharate (sodium salt)

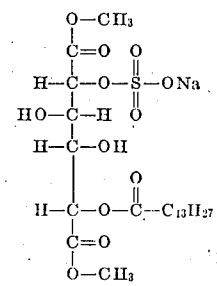

Dipalmitic acid ester of sulphated trihydroxy butyryl acid (monoethanol amine salt)

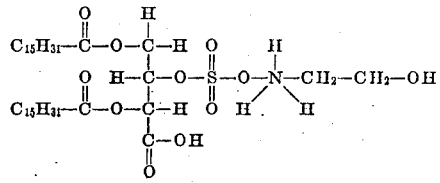

Stearic acid ester of diethyl mucic acid sulphate (sodium salt)

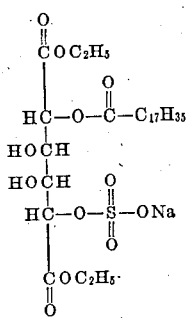

In the above examples I have not illustrated any disulphate compounds. In any of the formulae containing a free hydroxy group, such free hydroxy group may be sulphated. Indeed, in many cases in which a mono-ester of a polyhydroxy substance, such as glyceric acid, is treated to form the sulphuric acid ester, a portion of the mono-ester molecules will be esterified at more than one hydroxy group, thus producing a mixture. By controlling the amount of reagent and time, temperature and conditions of reaction, I am able to control the degree of sulphation with dependable and sufficient accuracy to produce the type of substance desired.

While the above list of the illustrative embodiments of my invention indicates single, pure substances only, it must be understood that mixtures may very well be used, either mixtures of single substances prepared independently or mixtures produced as such. For example, instead of esterifying glyceric acid with cetyl alcohol and then esterifying the resultant ester with sulphuric acid, I can employ a mixture of long chain alcohols obtained by hydrogenation of cocoanut fatty acids, such as is obtained from cocoanut oil, and esterify this mixture of alcohols with glyceric acid to form a mixture of the long chain alcohol esters of glyceric acid. This mixture I then esterify with sulphuric acid or chlorsulphonic acid to give me the finished product, which may be used as such, or which may be further treated to neutralize it.

As sources of lipophile groups, I may employ any one of a large number of substances having lipophillic properties or mixtures thereof, these substances being in general relatively high molecular weight carboxylic acids, specifically fatty acids, relatively high molecular weight hydroxy carboxylic acids, and relatively high molecular weight alcohols, having definite lipophillic properties. Examples of such substances are caproic, capric, caprylic, valeric, butyric, abietic, melissic, pentadecanoic, benzoic, benzoylbenzoic, naphthoic, toluic, palmitic, stearic, lauric, oleic, elaidic, myristic, ricinoleic, linoleic, and naphthenic acids, acids derived from animal and vegetable fats and oils including fish oils and the like, hydrogenated vegetable oils, alcohols resulting from the reduction of the fatty acids of vegetable and animal fats and oils, cetyl alcohol, lauryl alcohol, octyl alcohol, melissyl alcohol and other acids or alcohols of the same general character having lipophile characteristics giving the substance a marked affinity for oils and fats. As an example of another type of substance, I wish to call attention to octyl alcohol having a branched chain, for example 2-ethyl hexanol. This particular alcohol can be used with good results and is named merely as an illustration of another type of lipophile substance which can be employed with good results.

For the purpose of linking the lipophile and sulphate groups, I may employ any one of a large number of carboxylic acids characterized generally by the presence of at least two esterifiable hydroxy groups besides the acids and polymers thereof referred to hereinabove and utilized in many of the examples given. I may employ many other polyhydroxy acids of which the following are illustrative: Gluconic acid, glucuronic acid, galactonic acid, arabonic acid, gulonic acid, mannonic acid, trihydroxy-glutaric acid; polyhydroxy carboxylic oxidation products of polyglycerols, xylose, galactose, fructose, maltose, sucrose, glucose, sorbitol, dulcitol and arabitol.

The sulphate group or groups, as previously stated, may be left unneutralized or may be neutralized with suitable inorganic or organic neutralizing agents. Examples of inorganic neutralizing agents which may be used satisfactorily are ammonia gas, ammonium hydroxide, sodium carbonate, sodium hydroxide, potassium carbonate, potassium hydroxide, bicarbonates, antiacid materials of the alkali earth group and also other anti-acid materials, in which case the hydrogen of the sulphate group or groups is replaced by a cation such as sodium, potassium, ammonium, calcium, magnesium, aluminum, zinc, etc. I may also employ organic nitrogenous materials for the purpose of neutralizing the sulphate groups. Examples of organic substances adapted for the purpose are amines, quaternary ammonium hydroxides and other anti-acid organic nitrogenous substances, ethylene di-amine, mono-, di- and tri-ethanolamine, amyl amines, tetraethyl ammonium hydroxide, pyridine, quinoline, quinaldine, aniline, dimethyl aniline, etc. An additional advantage of those substances which are salts of hydroxyalkyl amines is that they are, in many cases, particularly resistant to salting out by acids, alkalis and salts.

For the purpose of introducing the sulphate groups, I may employ sulphuric acid, concentrated or fuming, chlorsulphonic acid, sulphuryl chloride, sulphur trioxide, solutions of sulphur trioxide and other so-called sulphonating agents. The treatment with these agents may take place in the presence or absence of solvents and condensing agents such as pyridine and the like.

The method for introducing the sulphate group differs in different cases and is dependent upon the material which is to be esterified with the sulphuric acid and the purpose for which the resultant product is to be employed.

An example of one of my methods is as follows: 103 parts by weight of diethyl tartrate are mixed at room temperature with 263 parts by weight of 20% oleum The mixture is then stirred with 100 parts by weight of coconut fatty acids and allowed to react about one hour or less. Care should be taken by mixing or otherwise to get the materials into an intimate homogeneous admixture. The product is then carefully neutralized with sodium hydroxide solution to form the salt of the sulphonated ester. The product thus obtained contains a considerable proportion of water and, in addition to the principal product, sulphated mono-fatty acid esters of diethyl tartrate (sodium salt), contains some unreacted material. If desired, the substance may be purified by extraction of the material at a pH of about 3 to 4 with ethyl ether.

Monostearyl and other mono-fatty acid esters of tartaric acid derivatives and other hydroxy organic acids and their derivatives may likewise be treated by the procedure just described.

With proper precautions so that temperatures are held under control and not permitted to rise to decomposition points, other polyhydroxy acids such as mannonic acid may similarly be converted into analogous esters in the above example. It is obvious, of course, that other alcohols and fatty acids, and other sulphonating agents may be employed so that substantially any of the types of products described in the present specification may be made by this method. Where rigorous requirements as to purity and the like are present, it may be advisable to employ other methods, particularly when dealing with certain classes of reagents.

Those of my substances which are freely soluble in water may be recovered from their solutions in any customary manner. As the mass of the lipophile radical increases, solubility in water tends to decrease and affinity for water is manifested by dispersibility in water. From these aqueous dispersions my substance may be readily recovered by "salting out" with suitable soluble electrolytes. Common salt is very satisfactory for this purpose in most cases. When salted out of an aqueous dispersion at temperatures ranging from 60° to 95° C., the substances are obtained in the form of a paste with a water content ranging from approximately 25 to 75 per cent. The more hydrophillic the substance, the greater the water content and, of course, the salt is present in the water of the paste in approximately the same concentration in which it existed in the dispersion from which the product was salted out. The product may be treated to remove the salt.

The compounds of my invention, although in many respects differing from each other in accordance with the numerous examples given and description of the variations in their properties, may be represented by the structural formula

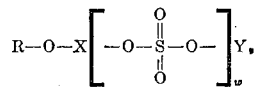

wherein R is an alkyl, acyl, or some other lipophile group, O is oxygen, X represents the residue of the organic polyhydroxy carboxylic acid which links together the lipophile group with the hydrophillic sulphate group, S stands for sulphur, Y is a cation, and $w$ and $v$ are small whole numbers, at least one.

Some of my substances may also be represented by the formula

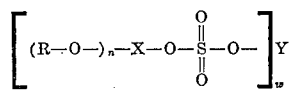

wherein R is an alkyl or acyl radical, X is the residue of an aliphatic polyhydroxy carboxylic acid with at least two esterifiable hydroxy groups remaining after combining the polyhydroxy substance with at least one lipophile group and at least one hydrophile sulphate group, Y is a cation, and $w$ and $n$ are integers.

Some of my substances may also be represented by the formula

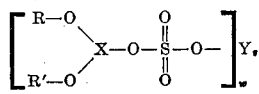

wherein R and R' represent lipophile groups which together are the lipophile portion of the molecule as a whole, X is the residue of an aliphatic polyhydroxy carboxylic acid with at least two esterifiable hydroxy groups, Y is a cation, and $w$ and $v$ are small integers. In general, the lipophile group in substances represented by this formula should have 18 carbon atoms or less, although substances of this character may be employed in which the lipophile groups contain more than 18 carbon atoms.

I have also found that the addition of certain materials to the substances with which my invention is concerned, as hereinabove described, markedly enhances their capacity to lower the surface tension of water, increases their serviceability as "wetting-out agents" in the textile treating industry, and markedly improves many of their other valuable colloidal properties. Notably useful for this purpose are mono-oleyl diethylene glycol, mixed mono acid esters of diethylene glycol with mixed cocoanut fatty acids, mixed mono acid esters of glycerol with mixed cocoanut fatty acids, mono caprylin and the like.

Thus, the addition agents are hydrophillic lipins characterized by being aliphatic derivatives of water-soluble polyhydroxy substances having at least one free OH group. While these hydrophillic lipins in themselves may not be sufficiently balanced to have a marked effect either to prevent spattering of oleomargarine or decrease interfacial tension in water-oil emulsions as in the case of the hydrophillic lipins containing a semiesterized sulphuric acid group, they will have the effect of so modifying the surface phenomena of the latter in contact with an aqueous medium so as to affect the interfacial surface, surface tension and the penetrating and wetting properties.

I have noted that while my sulphuric esters in themselves produce a considerable lowering of surface tension, this effect is enhanced by the addition of the fatty acid esters, notwithstanding the fact that the concentration of the sulphuric esters proper is diminished.

It is to be noted that while I have chosen the lowering of the surface tension of water as a convenient means of illustrating the effect of these addition agents, this surface tension lowering is by no means their sole effect as they radically influence other valuable colloidal characteristics of the medium into which they are introduced as well as influencing the surface tension.

The substances which I add to my sulphuric esters for the purpose of enhancing their useful colloidal properties, may be represented by the structural formula

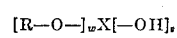

wherein R is an alkyl, acyl, or some other lipophile group, O is oxygen, H is hydrogen, $w$ and $v$ are small whole numbers, at least one, and X represents the residue of an organic hydroxy substance with at least one free hydroxy group remaining after combining said organic hydroxy substance with at least one lipophile group.

In the preceding specification, I have employed the term "hydrophillic lipin" in several places in a broad sense. That there may be no misunderstanding of the use of this term, the manner in which it is used, and the relationship of the improved compounds of my invention thereto, I wish to point out again from the standpoint of its terminology the manner in which the compounds of my present invention are produced.

I select preferably in the first instance a compound (or in some cases a mixture of compounds)

which has both a lipophillic group and a hydrophillic group. The compounds which I employ initially, however, are dominantly lipophillic, the hydrophile group, in most cases, for example, a single "OH" group, being of insufficient strength or character to affect the more dominant lipophile group to any great extent. I then attach to the lipophile group, preferably at a hydroxy carboxyl group, a hydroxy or polyhydroxy substance which in itself has some hydrophillic characteristics. I then attach a sulphate group to the hydroxy radical by sulphonation, as previously described.

Many processes employed in producing the improved compounds of my invention yield materials having a proportion of water mixed therewith. In most cases, the material is suitable for use in this condition without being dehydrated. It can be dispersed readily in additional amounts of water down to concentrations of, for example, one-tenth per cent or less, as in the illustration given above. In certain cases, however, the material may require dehydration either partially or entirely. Due to their pronounced hydrophillic properties, these materials however tend to retain some moisture in them even under very rigorous dehydration treatment so that except in extreme cases it may be said that the materials always have a proportion of moisture present.

It will be noted that while the strictly rigorous sense of the term "sulphonation" denotes the introduction of a sulphonic acid group, I have used this term throughout in the sense that it is employed technically in the industries. In every instance, sulphonation as employed in this specification denotes the formation of an ester of sulphuric acid.

I have described my invention in detail in order that those skilled in the art may practice the same, but it is obvious that I do not restrict myself to the specific details described, the invention being limited only by the scope of the appended claims.

The term "poly" is used in the specification and claims in the usual sense, to denote more than one.

The term "residue" is employed in its ordinary, accepted sense to connote that which remains after the reaction of certain groups. Thus, for example, where glyceric acid, a polyhydroxy carboxylic acid, is reacted with a fatty acid, such as lauric acid, to produce a mono-ester and is then treated with sulphuric acid or the like to produce mono lauric ester of glyceric acid mono sulphate, the "residue" of the polyhydroxy substance is

Throughout the specification and claims, the term "residue" is to be regarded as possessing the above connotation.

My present application is a continuation-in-part of my application Serial No. 106,708, filed October 21, 1936, issued August 27, 1940 as Patent No. 2,212,521, as a division of my application Serial No. 14,527, filed April 3, 1935, which latter application is a continuation-in-part of my application Serial No. 640,501, filed October 31, 1932, issued December 3, 1935, as Patent No. 2,023,387, now Reissue Patent 20,636.

I claim:

1. A chemical substance of the following formula

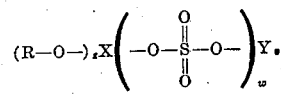

in which R represents an acyl radical of a carboxylic acid, X is a residue of a polyhydroxy carboxylic acid which links together the lipophile radical and the sulphate group, Y is a cation, and $z$, $w$ and $v$ are small whole numbers, at least one.

2. A chemical substance of the following formula

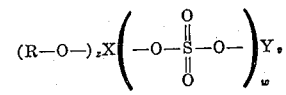

in which R represents an acyl radical of a fatty acid containing at least 4 carbon atoms, X is a residue of a polyhydroxy carboxylic acid which links together the lipophile radical and the sulphate group, Y is a cation, $z$, $w$ and $v$ are small whole numbers, at least one.

3. A chemical substance of the following formula

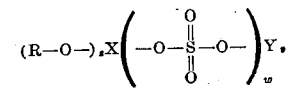

in which R represents an acyl radical of a fatty acid having at least 4 carbon atoms, X is a residue of glyceric acid which links together the lipophile radical and the sulphate group, Y is a cation, and $z$, $w$ and $v$ are small whole numbers, at least one.

4. A chemical substance of the following formula

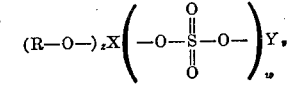

in which R represents an acyl radical of a fatty acid having at least 4 carbon atoms, X is a residue of tartaric acid which links together the lipophile radical and the sulphate group, Y is a cation, and $z$, $w$ and $v$ are small whole numbers, at least one.

5. A chemical substance of the following formula

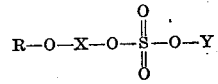

in which R represents a radical having at least 4 carbon atoms selected from the class consisting of alkyl and acyl radicals, X is the residue of a polyhydroxy carboxylic acid which links together the said radical and the sulphate group, and Y is a cation.

6. A chemical substance of the following formula

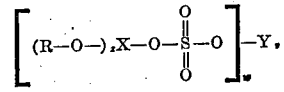

in which R represents an acyl radical of a cocoanut oil fatty acid, X is a residue of a polyhydroxy carboxylic acid which links together the said radical and the sulphate group, Y is a cation, and $z$, $w$ and $v$ are small whole numbers, at least one.

7. A chemical substance of the following formula

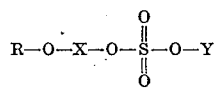

in which R represents a radical having at least 4 carbon atoms selected from the class consisting of alkyl and acyl radicals, X is the residue of glyceric acid which links together the said radical and the sulphate group, and Y is a cation.

8. A chemical substance of the following formula

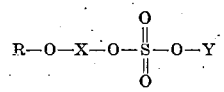

in which R represents a radical having at least 4 carbon atoms selected from the class consisting of alkyl and acyl radicals, X is the residue of tartaric acid which links together the said radical and the sulphate group, and Y is a cation.

9. A chemical substance of the following formula

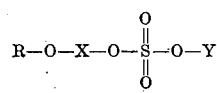

in which R represents a radical having at least 4 carbon atoms selected from the class consisting of alkyl and acyl radicals, X is a residue of a substance from the class consisting of polyhydroxy carboxylic acids and esters thereof, and Y is a cation.

10. Sodium salt of sulphated cetyl glycerate.

11. A chemical substance of the following formula

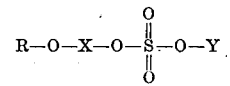

in which R represents an acyl radical of a cocoanut oil fatty acid, X is a residue of a polyhydroxy carboxylic acid which links together the said radical and the sulphate group, and Y is the cation of a nitrogenous base.

12. A chemical substance of the following formula

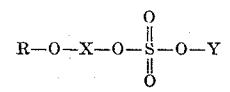

in which R represents an acyl radical of a cocoanut oil fatty acid, X is a residue of a substance from the class consisting of polyhydroxy carboxylic acids and esters thereof, and Y is a cation.

BENJAMIN R. HARRIS.